US008996043B1

(12) United States Patent
Oroskar (10) Patent No.: US 8,996,043 B1
(45) Date of Patent: Mar. 31, 2015

(54) DYNAMIC PAGING BASED ON THE CODEC USED BY A WIRELESS DEVICE

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 44 days.

(21) Appl. No.: 13/708,451

(22) Filed: Dec. 7, 2012

(51) Int. Cl.
*H04W 68/00* (2009.01)

(52) U.S. Cl.
CPC ..................................... *H04W 68/00* (2013.01)
USPC ......... 455/458; 455/426.1; 455/515; 370/312

(58) Field of Classification Search
CPC ... H04W 68/00; H04W 88/181; H04W 68/08; H04W 68/06
USPC .......................... 455/426.1, 458, 515; 370/312
See application file for complete search history.

(56) References Cited

U.S. PATENT DOCUMENTS

| 5,991,642 | A | * | 11/1999 | Watanabe et al. | 455/560 |
| 6,035,203 | A | * | 3/2000 | Hanson | 455/458 |
| 6,108,518 | A | * | 8/2000 | Madour et al. | 340/7.25 |
| 7,821,953 | B2 | | 10/2010 | Yarlagadda et al. | |
| 8,160,619 | B1 | * | 4/2012 | Oroskar et al. | 455/458 |
| 8,565,792 | B1 | * | 10/2013 | Vargantwar et al. | 455/458 |
| 2002/0114284 | A1 | | 8/2002 | Kronestedt et al. | |
| 2007/0043558 | A1 | * | 2/2007 | Schwarz et al. | 704/207 |
| 2007/0242704 | A1 | * | 10/2007 | Jiang | 370/522 |
| 2008/0261628 | A1 | * | 10/2008 | Proctor et al. | 455/458 |
| 2013/0308579 | A1 | | 11/2013 | Pulugurta et al. | |

* cited by examiner

*Primary Examiner* — Barry Taylor (57) ABSTRACT

Methods and systems are disclosed that may help to adjust the paging process for a wireless communication device (WCD) according to the codec that was last assigned to the WCD. An exemplary method may involve a radio access network (RAN): (a) determining that a wireless communication device (WCD) should be paged in a coverage area of the RAN; (b) determining a codec that was last assigned to the WCD in the coverage area; (c) using the last-assigned codec as a basis for adjusting a paging process that is used to page the WCD; and (d) paging the WCD according to the adjusted paging process.

23 Claims, 6 Drawing Sheets

DYNAMIC PAGING BASED ON THE CODEC USED BY A WIRELESS DEVICE

BACKGROUND

In a typical cellular wireless communication system, such as a radio access network (RAN), an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet. When a wireless communication device (WCD), such as a cellular telephone, pager, or wirelessly-equipped computer, is positioned in a cell, the WCD communicates via an RF air interface with the base station antennae of a cell. Consequently, a communication path can be established between the WCD and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by WCDs in the coverage areas and orchestrating handoff of calls between coverage areas. In turn, a switch and/or gateway may control one or more base station controllers and generally control wireless communications, by performing functions such as receiving and processing call requests, instructing base station controllers when to assign traffic channels, paging WCDs, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may define an air interface "access channel" on which WCDs can send "access probes" seeking to originate calls (e.g., voice calls, data sessions, and/or other "calls") or seeking to register their presence in the sector. Further, each sector may define an air interface "paging channel" on which the serving base station can page a WCD. For example, paging channel may be used to send access probe acknowledgements and traffic channel assignment messages to served WCDs. The paging channel also defines timeslots in which the base station can send various messages to particular WCDs. For instance, if an access probe is received from one WCD seeking to connect to a second WCD, the base station may send a page via the paging channel to notify the second WCD of the incoming call.

If a base station has numerous such messages to send, however, the paging channel can become congested, which may delay call setup or even result in a page not reaching the intended WCD. Accordingly, in a further aspect of existing CDMA access networks, base station commonly group a certain number of pages (that are typically intended for different WCDs) into a common page message for transmission via the paging channel. Furthermore, to conserve bandwidth, and so that more pages can be transmitted per timeslot, each page in a page message may be concatenated.

Further, codecs may be utilized to encode and decode certain types of communications in a RAN. As such, a WCD may use various types of codecs to encode and/or decode voice calls, video calls, and/or other types of calls, when engaging in such communication. Further, the encoding associated with each codec may impact the amount of network resources that are used for a given communication. For example, communications that are encoded according to a first codec may use more traffic-channel bandwidth than communications that are encoded according to a second codec. Other examples are also possible.

OVERVIEW

In an exemplary embodiment, a wireless communication device (WCD) may support various types of codecs. These codecs may define how media content (e.g., voice, music, still images, and/or video) are encoded and decoded. Different codecs may have different features. For instance, a voice codec used by a WCD might encode and decode digital voice at a rate of 1 to 15 kilobits per second. However, to achieve these bit rates, some of the information present in an input analog voice signal (e.g., high-frequency spectral components) may be lost when digitized. Thus, codec design can be a tradeoff between achieving a low bit rate for a particular type of media (which is desirable to conserve network and storage capacity) and the user-perceived quality of the media produced by the codec, which typically improves as more bandwidth is utilized.

In general, there may be a roughly linear relationship between codec bit rate and the media quality that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than another voice codec operating at 9.6 kilobits per second.

In one aspect, a RAN may be configured to concatenate a page according to varying page-concatenation levels, which correspond to varying amounts of concatenation. In particular, pages may be concatenated and grouped into general page messages that include a number of page messages, possibly directed to different target WCDs.

When more concatenation is applied to pages, this may reduce the size of the pages and thus help to reduce the paging-channel occupancy. However, there may be a tradeoff when more concatenation is applied to pages. In particular, because some information is inevitably lost through concatenation, the probability of a WCD receiving a page may decrease due to concatenation of the page.

In another aspect, there may be various scenarios where a radio access network (RAN) assigns a codec to a given WCD, such as during call setup and/or when paging a WCD. When the RAN assigns a codec, the RAN may select from two or more different codecs that are supported by the given WCD. Since wireless spectrum is limited, it may benefit wireless network operators to allocate wireless resources judiciously, and codec selection and assignment is an opportunity to do so.

Therefore, when multiple codecs are supported by a particular WCD, a RAN may be configured to consider various factors when determining which codec to assign to the WCD, such as factors indicating the utilization of network resources in the sector where the WCD is located.

Further, in an exemplary embodiment, a RAN may attempt to assign a codec that provides a higher-quality experience to the user, when possible. Thus, when a WCD is assigned or is likely to be assigned a high-quality codec for a call that is being set up, it may be desirable to increase the likelihood that the call will successfully be established.

Accordingly, exemplary embodiments may vary the amount of concatenation that is applied to a page consider based on the codec that was last assigned to a WCD. As an example, when the RAN is about to page a WCD to establish a call in a certain coverage area, the RAN may determine the codec that was last assigned to the WCD in that coverage area. If the WCD was recently assigned a certain codec in a coverage area, it may be taken as an indication that the WCD is more likely to be assigned that codec for a new call in that coverage area. Accordingly, if the last-assigned codec for a WCD in a certain coverage area provides for a higher-quality voice call, then this may be interpreted as an indication that the WCD is likely to be assigned a higher-quality codec for a new call. Accordingly, the RAN may apply less concatenation (or possibly no concatenation) to a page to a WCD for a new call, if the last-assigned codec for the WCD was a high-quality codec, and vice versa. By doing so, the RAN may increase the likelihood that a page is successful, when there is a greater likelihood that the target WCD will be assigned a higher-quality codec.

In one aspect, an exemplary method may involve: (a) a radio access network (RAN) determining that a wireless communication device (WCD) should be paged in a coverage area of the RAN; (b) determining a codec that was last assigned to the WCD in the coverage area; (c) using the last-assigned codec as a basis for adjusting a paging process that is used to page the WCD; and (d) paging the WCD according to the adjusted paging process.

In another aspect, a radio-access-network component may include a non-transitory computer readable medium and program instructions stored on the non-transitory computer readable medium. The program instructions may be executable by at least one processor to: (a) determine that a wireless communication device (WCD) should be paged in a coverage area of a radio access network (RAN); (b) determine a codec that was last assigned to the WCD in the coverage area; (c) use the last-assigned codec as a basis to adjust a paging process that is used to page the WCD; and (d) page the WCD according to the adjusted paging process.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Exemplary Communication Networks

Referring to the drawings, as noted above, FIG. 1 is a simplified block diagram of a wireless communication network in which an exemplary method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

Figure 1:
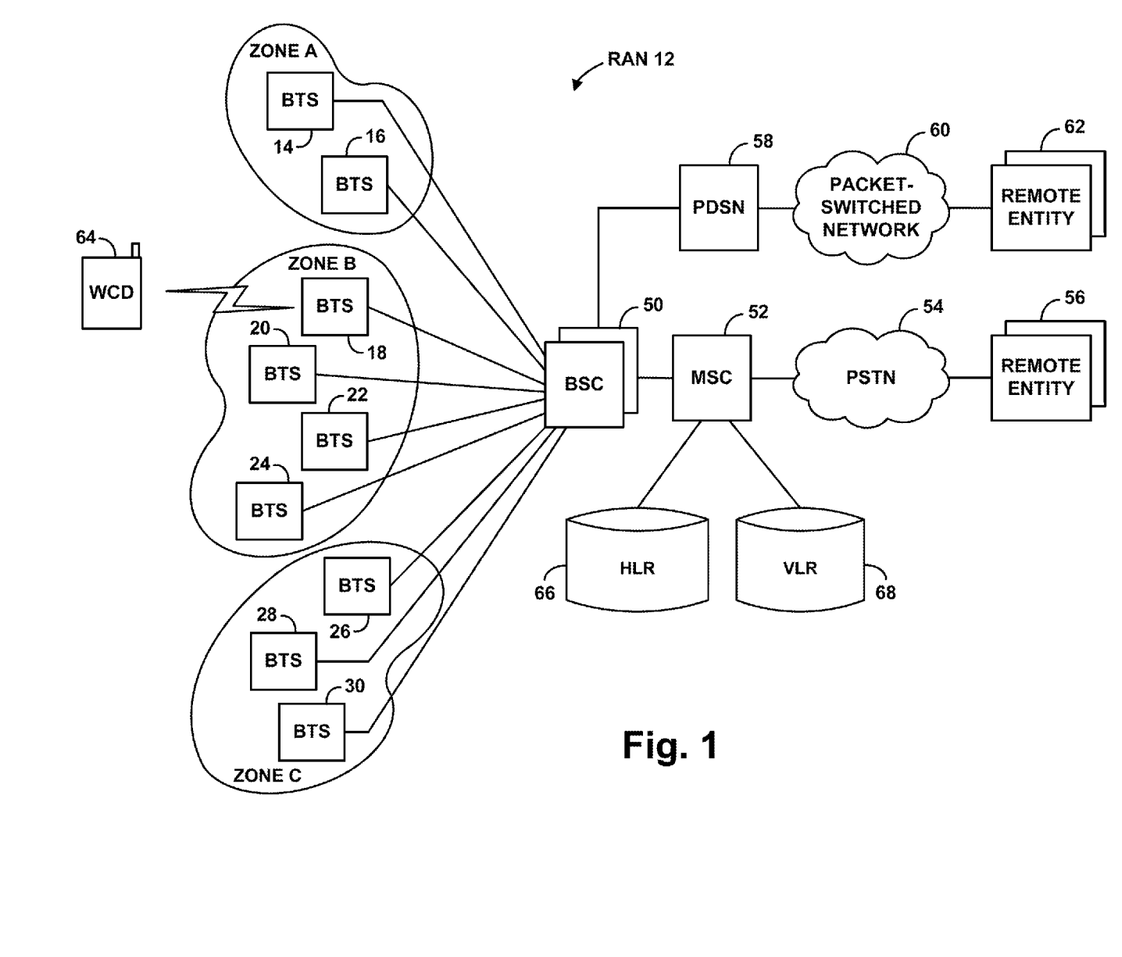
FIG. 1 is a simplified block diagram of a wireless communication network in which an exemplary method can be implemented.

As shown in FIG. 1, the exemplary network includes at its core a radio access network (RAN) 12 that radiates to define numerous coverage areas in which wireless communication devices (WCDs) can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas to communicate with WCDs in those coverage areas. The coverage areas can be cell sites, cell sectors, or some other defined wireless coverage area (possibly even a combination of coverage provided by multiple base stations).

Each base station controller may be coupled with one or more switches, such as a mobile switching center (MSC) 52, which provides connectivity with the public switched telephone network (PSTN) 54, so that served WCDs can communicate with remote entities 56 on the PSTN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, which could be a cell phone, wirelessly equipped personal digital assistant (PDA), or any other type of wirelessly-equipped device now known or later developed. The WCD is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above. Further, WCD may include a user interface, which typically includes components for receiving input from a user of WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each WCD, such as WCD 64, typically has at least one associated identifier that uniquely identifies the WCD. By way of example, a WCD may have a unique mobile directory number (MDN), a unique International Mobile Subscriber Identity (IMSI), a unique MAC address, or some other identifier dynamically or statically assigned to the WCD, which may serve as its address for receiving air interface communications transmitted to it by the RAN. As a specific example, an IMSI is a unique number associated with the WCD, typically taking the form of the WCD's phone number. Additionally or alternatively, each WCD may be assigned a mobile identification number (MIN).

To keep track of where WCDs, such as WCD 64 are operating, a RAN 12 may include a visitor location register (VLR) 68 and a home location register (HLR) 66, as shown in FIG. 1. VLR 68 may include information related to WCDs that are currently being served by MSC 52, while HLR 66 may include information related to all WCDs that utilize RAN 12.

In a further aspect, each WCD may have a service profile stored in the HLR 66 and/or in the VLR 68 that corresponds to the MSC 52 that is currently serving a WCD 64. Each MSC 52 may be coupled to the HLR 66 and or its VLR 68 by an out of band signaling network such as a Signaling System #7 (SS7) network, for instance, and may thus access the service profile for a WCD using an identifier for the WCD, such as its MIN, MDN, and/or IMSI.

VLR 68 and/or HLR 66 may obtain information regarding the locations of WCDs through registration messages that the WCDs transmit at various times. For example, a WCD might transmit a registration message that identifies its current cell-sector when the WCD first powers-up, at regular time intervals thereafter (e.g., every 10 minutes), and in response to other triggers (such as moving a certain distance or moving into a different paging zone). These registration messages could be received by VLR 68 and HLR 66. In this way, VLR 68 and HLR 66 may maintain location for each WCD in its service area (which could be, for VLR 68, the area served by MSC 52 and, for HLR 66, all areas served by RAN 12). The location information for a WCD could include an identification of the cell-sector that the WCD reported in its most recent registration message and the date/time of the most recent registration message. HLR 66 and/or VLR 68 could also maintain other types of location information for WCDs.

II. Exemplary RAN Component

Figure 2:
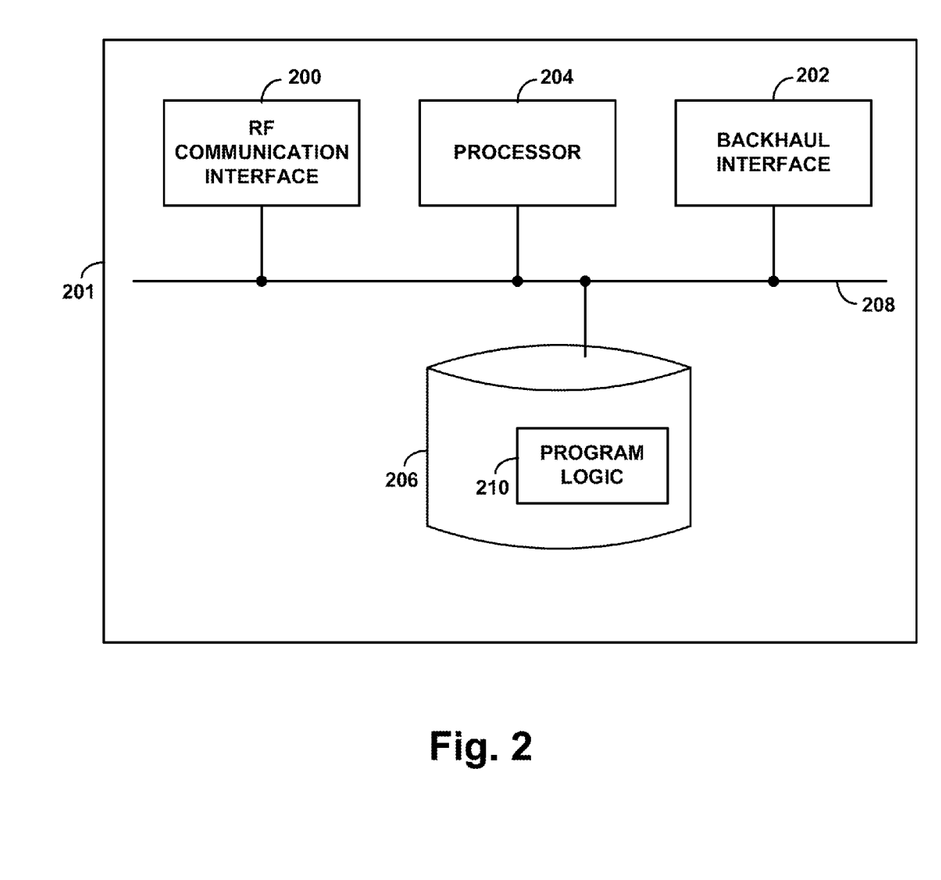
FIG. 2 is a simplified block diagram showing functional components of a radio-access-network component, according to an exemplary embodiment.

FIG. 2 is a simplified block diagram showing functional components of a RAN component 201, according to an exemplary embodiment. RAN component 201, which could be a base station or a switch, for example, or could take another form. As shown, the RAN component 201 may include an RF communication interface 200, a backhaul interface 202, a processor 204, and data storage 206, all of which may be communicatively linked together by a system bus, network, or one or more other connection mechanisms 208.

In practice, RAN component 201 may take the form of or include one or more BTS and/or a BSC, such as BTSs 18-24 and/or BSC 50 for instance, or may take the form of a switch, such as MSC 52. Accordingly, the illustrated components of RAN component 201 (e.g., communication interface 200, a backhaul interface 202, a processor 204, and data storage 206) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 201, RF communication interface 200 may comprise one or more antenna structures, one or more power amplifiers, and associated equipment, for engaging in RF communication with WCDs operating within the base station's coverage, according to one of the air interface protocols noted above for instance. Backhaul interface 202 may comprise any sort of communication link or mechanism enabling the base station to exchange signaling and bearer data with other RAN entities, such as with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204. As further shown, data storage 206 preferably contains program logic 210 (e.g., machine language instructions) executable by processor 204 to carry out various functions, such as the functionality of the exemplary methods and systems described herein.

III. Exemplary Codecs

A RAN 12 and/or a WCD 64 may use various types of codecs to encode and/or decode a voice call and/or other types of communications. A codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may include the same (or a similar) voice codec to decode the utterance from the particular format so that the destination WCD can play out the resulting signal.

In general, there may be a roughly linear relationship between codec bit rate and the media quality (e.g., the voice quality) that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of codecs, several different voice codecs are compared and contrasted below. In an exemplary embodiment, CDMA wireless networks may use one or more codecs from the Enhanced Variable Rate Codec (EVRC) family.

For instance, the EVRC-A codec operates on input speech signals sampled with 16-bit resolution 8,000 times per second (i.e., a sampling rate of 8,000 Hz). The resulting 128 kilobit per second stream is divided into 20 millisecond frames, each of which is compressed to either 171 bits (8.55 kilobits per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec, which may also be referred to as CMDA service option (SO) 73, supports some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB.

To support both EVRC-B and EVRC-WB, EVRC-NW includes eight capacity operating points (COPs), which may be referred to as EVRC-NW COP 0 to COP 7, or simply as COP 0 to COP 7. Under EVRC-NW, COP 0 is a rate 1 wideband voice encoder. Further, EVRC-NW COP 4 is a narrowband voice encoder as defined under EVRC-B. EVRC-NW COPs 1 to 3 are narrowband voice encoders that provide higher voice quality as compared to EVRC-B, with COP 1 providing the greatest improvement over EVRC-B. Further, EVRC-NW COPs 5 to 7 are narrowband voice encoders that provide lower voice quality as compared to EVRC-B, with COP 5 being the closest to EVRC-B in quality.

In an exemplary embodiment, a RAN 12 may be configured to determine which codec or codecs are supported by a given WCD, and to assign one of the supported codecs to the WCD to use for a given communication. The RAN 12 may determine the codec or codecs that are supported by a particular WCD in various ways. For example, when a WCD 64 originates a call, the WCD 64 may transmit an origination message to the RAN 12. This origination message may include an indication of the service options supported by the WCD 64. For instance, the origination message may include the WCD's preferred service option (e.g., service option 73) as well as one or more auxiliary service options (e.g., service option 3 and/or service option 68) that the WCD also supports.

Further, for a WCD receiving a call (e.g., a callee WCD), the RAN may store or have access to a profile that includes indications of the service options supported by the WCD. This profile may also specify the WCD's preferred service option as well as one or more auxiliary service options that the WCD also supports. Thus, for an incoming call to a callee WCD, the RAN may receive an indication that a call has arrived at the RAN for the callee WCD, access the profile of the callee WCD to determine the supported codecs, and based on various factors discussed in more detail below, determine which codec to assign to the callee WCD for the call.

In some embodiments, the HLR and/or the VLR may indicate the service option capabilities for individual WCDs that have registered with the RAN. For example, the HLR and/or VLR may indicate that a particular WCD is configured for SO 73. In an exemplary embodiment, this may be interpreted as implying that the particular WCD is capable of using any of COP 1 to COP 7, and that a base station (e.g., a BTS), may negotiate whether the particular WCD is capable of COP 0 (i.e., HD Voice).

As such, before a BTS 18 pages a WCD 64 for a voice call, the BTS may coordinate with its serving MSC to access the VLR and determine which service options are supported by the WCD 64. Further, when a WCD that supports EVRC-NW (i.e. SO 73) acknowledges a page by sending the RAN 12 a page response message, the WCD may also indicate the particular operating points that are supported by the WCD in the page response message.

In an exemplary embodiment, a RAN may consider various factors when determining which codec should be assigned to a WCD for a given call. For example, in some embodiments, the RAN may consider the utilization of at least part of the RAN infrastructure. If the utilization of a wireless coverage area serving the WCD, a wireless coverage area that is likely to serve the WCD, a BTS, a BSC, and/or a backhaul link between any RAN and/or non-RAN components is too high, it may be preferable to instruct the WCD to use a codec with a lower expected bit rate, such as EVRC-A or EVRC-B. However, if this utilization—or utilizations—is not too high, it may be preferable to allow the WCD to use a codec that supports a higher expected bit rate, and thereby potentially increasing the media quality of the call. In this latter case, the RAN may instruct the WCD to use a codec with a higher expected bit rate, such EVRC-NW COP 0 or COP 1.

Once the RAN has assigned a codec to a WCD to use for a call, the RAN may notify the WCD of the assigned codec. For example, according to SO 73, a base station may send the WCD a Service Option Control message that includes the particular operating point that is assigned to the WCD for the call (e.g., one of COP 0 to COP 7). Other examples are also possible.

In some embodiments, a RAN may attempt to assign EVRC-NW COP 0 to all WCDs that support COP 0, unless the utilization of network resources in a coverage area is too high. This may be done in an effort to provide WCDs with the best call quality that is possible, and/or for other reasons. In the event that the utilization is too high, then the RAN may select a codec that provides lower quality, such as one of EVRC-NW COPs 1 to 7.

Determining whether the utilization is "too high" may be based on one or more utilization thresholds. For instance, the RAN may measure the utilization of a wireless coverage area serving the WCD and compare the measured utilization to a utilization threshold. If the measured utilization exceeds the utilization threshold, the RAN may instruct the WCD to use EVRC-B. Otherwise, the RAN may instruct the WCD to use EVRC-WB or EVRC-NW. The utilization threshold may be represented as a percentage, such as 30%, 40%, 50%, 60%, 70%, and so on.

It should be understood that the codecs described herein are only examples. Other voice or non-voice codecs may be used instead.

IV. Zone-Based Paging

Referring again to FIG. 1, when RAN 12 seeks to page a WCD 64 (e.g., for an incoming call or for some other reason), a switch, such as MSC 52, may send a page to numerous base stations in the switch's coverage area, such as BTSs 18-24, with the hope that when the base stations broadcast the page message, the WCD will receive the page message in one of the associated sectors, and will respond. Given the scarcity of paging channel resources, however, most modern cellular networks are instead arranged to engage in a more targeted paging process known as "zone-based paging."

With zone-based paging, a cellular network is divided into paging zones, each with a respective zone ID, and paging is performed on a zone-basis. To facilitate this, each base station in the system may broadcast as one of its overhead parameters the zone ID for the zone in which the base station is located. WCDs operating in the network may then programmatically monitor the zone IDs indicated in the overhead messages and may automatically register with the network when they detect that they have moved into a new zone, or for other reasons. To register with the network, a WCD may send a registration message via the access channel in its current sector, and a switch in the network would note the WCD's registration and convey an indication of the registration to a home location register for later reference.

With this process, the registration records thereby maintained by switches and/or home location registers will indicate the paging zone in which each WCD last registered. When a switch seeks to page a WCD, the switch may then efficiently send the page message to just those base stations that are within the zone of the WCD's last registration, as it is likely that the WCD is in that zone. Further, the switch may send the page message to the base stations in zones adjacent to the WCD's zone of last registration, to cover the possibility that the WCD has moved to a new zone but has not yet registered its presence in the new zone. Once the designated base stations transmit the page message, if the WCD does not respond to the page, the switch may then broaden the scope of the page, by sending the page message to a wider range of paging zones and perhaps ultimately to all base stations in the switch's serving area.

Using the general paging strategy that is implemented in many wireless access networks, the network may make up to three attempts to page a WCD. In particular, the network may first attempt to transmit a page record in the paging zone in which the WCD is registered (i.e., the base stations in the paging zone in which the WCD is registered transmit the page record). Then, if the first attempt is unsuccessful (i.e., the WCD does not acknowledge the page record), the network makes a second attempt to page the WCD by again transmitting the page record in the paging zone in which the WCD is registered, and possibly in adjacent zones as well. If the second attempt also fails, then the network makes a third attempt to page the WCD, which typically involves a system-wide transmission of the page record (i.e., in all paging zones), although it is possible that a third attempt may be of a different scope as well.

As shown in FIG. 1, the base stations are grouped into zones A, B, and C to facilitate zone-based paging as described above. In particular, each base station may broadcast a zone ID indicating its zone, and a WCD such as WCD 64 may monitor the zone IDs broadcast in the coverage areas where the WCD is operating. When the WCD detects a change in zone ID, the WCD may then responsively register its presence in the new zone, so that the RAN would then know to page the WCD in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As noted above, an MSC 52 may also include or have access to WCD registration data, such as registration data stored in an HLR 66 and/or a VLR 68. The WCD registration data for a given WCD may indicate the zone in which the WCD is currently registered, among other possible information. For example, HLR 66 and/or VLR 68 may include, for each WCD that is served by MSC 52, the WCD's current zone of registration. Alternatively, such registration data may be stored internally by an MSC and/or a base station, or by another RAN component or entity that is in communication with a RAN.

V. Intersystem Paging

Figure 3:
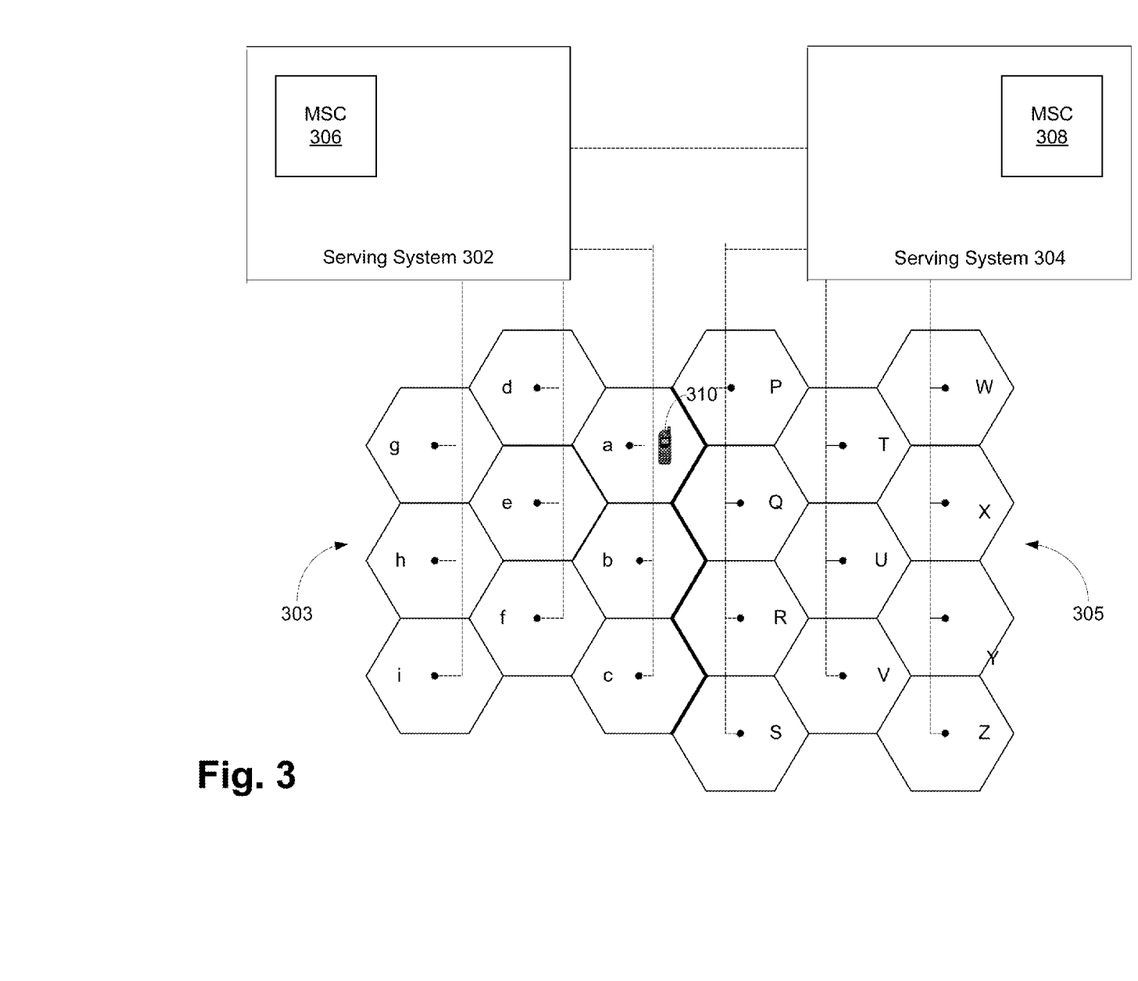
FIG. 3 is a block diagram illustrating a portion of the coverage area in a radio access network, according to an exemplary embodiment.

In a further aspect, a RAN may also be configured for "intersystem paging" (which may also be referred to as "border cell paging" or "BCP"). Intersystem paging settings specify how a WCD should be paged when the WCD is located at or near a border between serving systems (each serving system including a switch and its corresponding base stations) in a RAN's coverage. FIG. 3 is a block diagram illustrating a portion of the coverage area in an exemplary RAN, which includes two systems 302 and 304 serving coverage areas 303 and 305, respectively. In an exemplary embodiment, each system 302 and 304 is controlled by a respective MSC 306 and 308. Each system 302 and 304 provides service in a number of sectors that are served by the respective MSC (via one or more base stations (not shown)). In particular, MSC 306 serves sectors a-i, which collectively may be referred to as coverage area 303, and MSC 308 serves sectors P-Z, which collectively may be referred to as coverage area 305. In coverage area 303, sectors a-c, which are located at the border of the paging zones, are considered to be border sectors, and collectively are considered a border zone within system 302. Similarly, in coverage area 305, sectors P-S are considered to be border sectors, and collectively are considered a border zone within system 304.

When a WCD is located in a border zone, the serving MSC may be configured to send a page locally (i.e., in the sector or zone in which a mobile is registered), and to additionally send the page to the MSC serving the bordering system. Therefore, the WCD can also be paged in the bordering system, which may improve service in the event that the WCD has traveled into the coverage area of the bordering system since it last registered. Accordingly, if the WCD responds to a page from the serving system, then call setup proceeds normally. If, on the other hand, the WCD responds to a page from the bordering system, the call may be transferred to the bordering system.

For example, when a call arrives for a WCD 310 registered in system 302, the serving MSC 306 may determine if the WCD was last registered in a border zone (i.e., if the sector in which the WCD last registered is a border sector). If the WCD 310 is not registered in a border zone, then the MSC 306 proceeds to page the WCD as it otherwise would (i.e., sends a page in the sector in which the WCD is registered, and possibly neighboring sectors as well). In the illustrated scenario, however, the WCD 310 is registered in sector a, which is in the border zone of system 302. Therefore, in addition to sending the page in sector a (and possibly nearby sectors as well), the MSC 306 sends an "intersystem" page to the MSC 308 serving the bordering system 304. MSC 308 may then send the intersystem page to WCD 310 in its border zone, which includes sectors P-S (via the base station or base stations serving these sectors). If the WCD 310 responds to a page from system 302, then the call proceeds normally. If, on the other hand, the WCD 310 responds to a page from system 304, the call may be transferred to system 304.

In an exemplary embodiment, intersystem paging may be implemented using ISPAGE2 functionality, as defined by the ANSI-41 protocol (which is also referred to as IS-41). As such, intersystem pages may be relayed between systems (i.e., between MSCs) using ISPAGE2 messaging, as specified in ANSI-41. ISPAGE2 and ANSI-41 are well known in the art, and thus not described in detail herein. Further, it should be understood that the term "intersystem page", as used herein, may include any page that sent by an MSC other than the MSC serving the zone in which a given WCD is registered. As such, an MSC may identify any page it receives from another MSC, or any page it sends to another MSC, as an intersystem page.

In an exemplary embodiment, a switch may have various paging-scheme settings that affect the manner in which the intersystem paging is implemented. For example, an exemplary MSC 306 may be configured to adjust the attempt count at which intersystem paging is enabled. As another example, an MSC 306 may adjust settings for intersystem paging such that intersystem paging is not enabled until the second or third attempt to send a given page, or may adjust the settings such that intersystem paging is enabled for all attempts to send the page. An exemplary MSC 306 may define other settings for intersystem paging, which may also affect the manner in which intersystem paging is implemented.

VI. Concatenating Pages

In an example embodiment, a base station may be configured to create a general page message (GPM) that includes multiple paging-channel messages, such that multiple WCDs can be paged using a single page message. (For clarity, each individual page to a WCD that is included in a larger "general page message" may be referred to as a "page record" or "paging-channel message.") Before transmission, page records may be concatenated so that more page records may be included in a page message than otherwise could be. For example, in some implementations, one concatenation level may correspond to concatenation that allows up to eight page records to be concatenated in a single GPM. Additionally or alternatively, other concatenation levels may correspond to concatenation of pages in a GPM such that at least five page records may be included in a single GPM. Other concatenation levels and/or concatenation techniques are also possible.

In an exemplary embodiment, concatenation may be applied only to types of paging-channel messages that are being sent to specific WCDs, such as pages to initiate voice calls and FNMs, but not to other types of paging-channel messages, such as overhead messages. However, it should be understood that in other embodiments, concatenation may not be limited to any particular type or types of paging-channel messages.

Without concatenation, a single page message that occupies two half frames in the paging channel, typically does not include more than four page records. In comparison, when concatenation is applied, an example concatenation level may allow for a GPM in which two page records are concatenated to be sent in two to three half frames, which in turn may allow for five page records to be sent in a single timeslot. Applying additional concatenation, another possible concatenation level may allow for two to eight page records to be concatenated in a GPM that is sent in two half frames, which in turn may allow a base station to transmit eight page records in a timeslot.

When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff since more page records are being concatenated into the same 80 ms slot. Thus, while concatenating page records into a GPM may reduce the load on the paging channel, thereby helping to reduce paging channel occupancy (PCO), concatenation may also result in some page records failing to reach their intended WCDs, thus reducing the paging-success rate (PSR).

VII. Exemplary Methods

Figure 4:
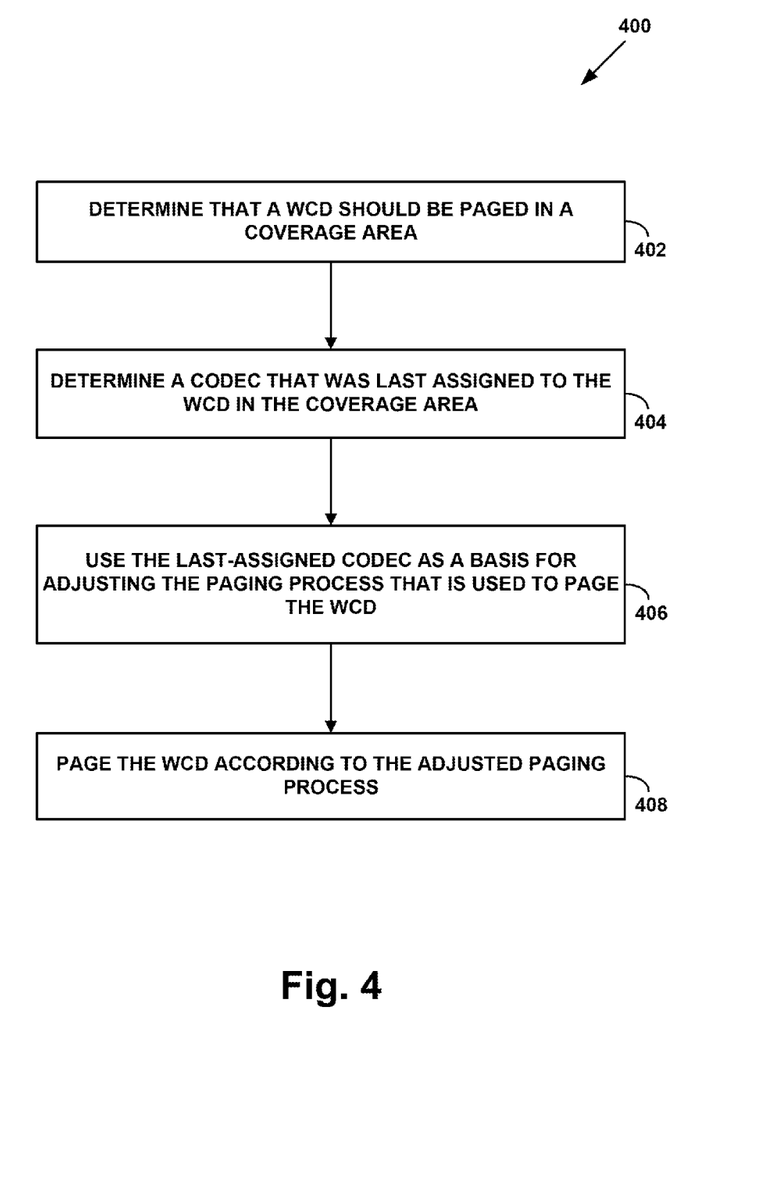
FIGS. 4, 5A, and 5B are flow charts illustrating methods, according to exemplary embodiments.

FIG. 4 is a flow chart illustrating a method 400, according to an exemplary embodiment. Using the method illustrated in FIG. 4, an access network may dynamically adjust how much concatenation is applied to a page to a WCD, depending upon the codec that was last assigned to the WCD in the coverage area where it is about to be paged.

In particular, the RAN may determine that a WCD should be paged in a coverage area of the RAN, as shown by block 402. The RAN may then determine a codec that was last assigned to the WCD in the coverage area, as shown by block 404. Herein, the codec that was last assigned to a WCD in a coverage area may be referred to as the "last-assigned codec." Once the last-assigned codec is identified, the RAN may use the last-assigned codec as a basis for adjusting the paging process that is used to page the WCD, as shown by block 406. The RAN may then page the WCD according to the adjusted paging process, as shown by block 408.

In a further aspect, a RAN may also consider the "staleness" of the last-assigned codec when adjusting the paging process. More specifically, if less time has elapsed between the assignment of the last-assigned codec and a page to establish a new call, then the last-assigned codec may be considered a better indicator of the codec that is likely to be assigned for the new call. Accordingly, block 406 may involve the RAN using the elapsed time since the assignment of the last-assigned codec as a further basis for adjusting the paging process that is used to page the WCD. For example, the RAN may condition the adjustment of the paging process on a determination that the elapsed time is less than a threshold period of time. Further, if the elapsed time is greater than the threshold period of time, then the RAN may simply use a default paging process, which is not adjusted according to the last-assigned codec.

A. Base-Station Implementations of Exemplary Methods

Figure 5A:
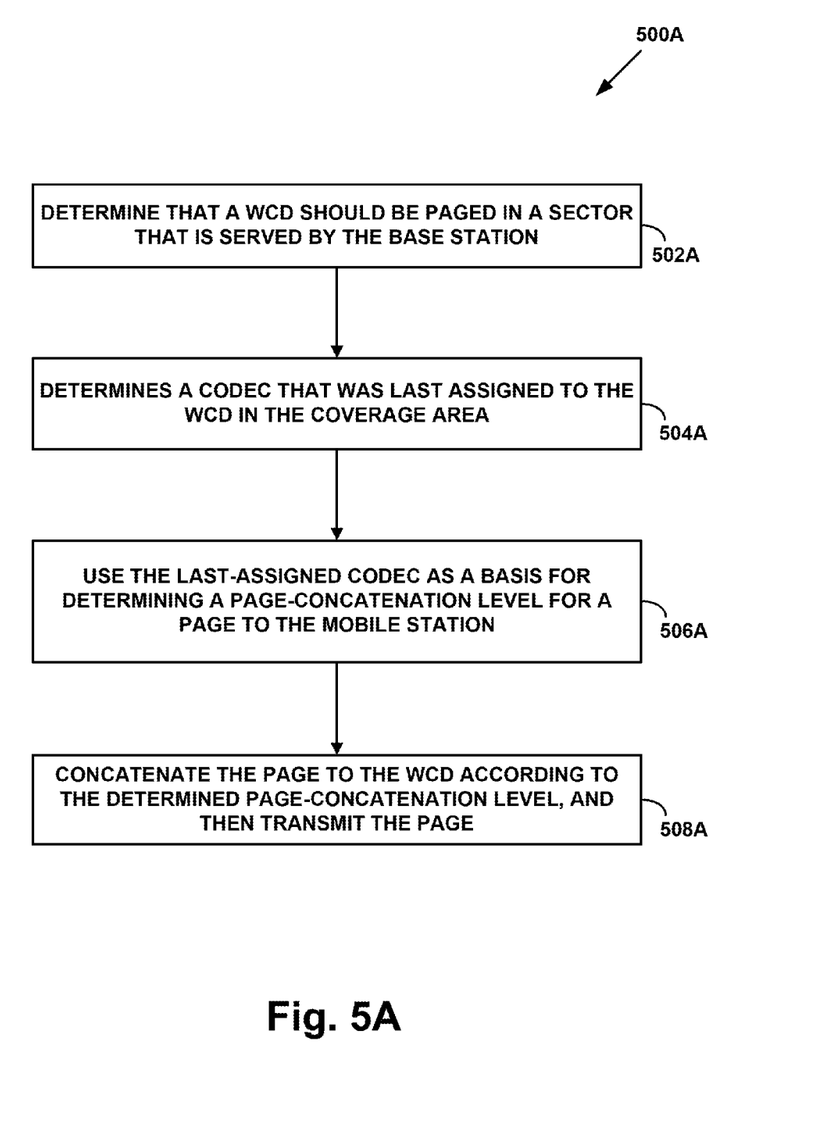

In some embodiments, method 400 may be implemented by a base station; e.g., by a BTS or a combination of a BTS and a BSC. For example, FIG. 5A is a flow chart showing a method 500A, according to an exemplary embodiment. Method 500A is an implementation of the method 400 shown in FIG. 4, in which the functions are carried out by a base station (e.g., a BTS and/or a BSC).

More specifically, method 500A involves a base station determining that a WCD should be paged in a sector that is served by the base station, as shown by block 502A. For example, at block 502A, a base station may receive a message from its serving switch (e.g., from an MSC) that indicates to page a WCD in a sector served by the base station. Further, the base station determines a codec that was last assigned to the WCD in the coverage area, as shown by block 504A. The base station may then use the last-assigned codec as a basis for determining a page-concatenation level for a page to the WCD, as shown by block 506A. As such, the base station may concatenate the page to the WCD according to the determined page-concatenation level and transmit the page, as shown by block 508A.

In order to determine the codec that was last assigned to a given WCD, at block 504A, a base station may reference a codec database that is maintained by the base station. To support this functionality, a base station can maintain a codec database that indicates the last-assigned codec or codecs for particular WCDs in particular coverage areas. For instance, whenever a base station instructs a WCD to use a certain operating point under EVRC-NW, the BTS may store a record of the operating point that is assigned to the WCD (e.g., one of EVRC-NW COPs 0 to 7), as well as an indication of the coverage area (e.g., the cell ID or sector ID) in which the operating point that is assigned to the WCD. Accordingly, before base station pages a WCD, the base station may access the codec database to determine the last-assigned codec for the WCD in the coverage area where the base station is about to page the WCD.

At block 506A, a base station may determine the page-concatenation level for a page to a WCD, based at least in part on the last-assigned codec. Thus, at block 508A, the function of paging the WCD according to the adjusted paging process may involve the base station concatenating a page to the WCD according to the determined page-concatenation level.

Note that in some instances, there may not be an entry for a given WCD in the codec database, for various reasons. In this case, block 504A may involve the base station determining that there is no last-assigned codec for the WCD in the coverage area where the page is about to be sent. In such case, block 506A may involve the base station selecting a default concatenation level. The default concatenation level may vary, depending upon the particular implementation.

In an exemplary embodiment, there may be a plurality of possible page-concatenation levels, with each level corresponding to one or more of the possible codecs. As such, to determine the page-concatenation level for the page, a base station may determine the page-concatenation level that corresponds to the last-assigned codec.

For example, in a RAN configured to support EVRC-NW, each paging concatenation level may be defined as corresponding to one or more of the capacity operating points that are defined under EVRC-NW. As one example, a first concatenation level may be mapped to HD Voice (i.e., EVRC-NW COP 0), a second concatenation level may be mapped to any of EVRC-NW COPs 1 to 3, a third concatenation level may be mapped to EVRC-NW COP 4, and a fourth concatenation level may be mapped to any of EVRC-NW COPs 5 to 7.

In the above example, when the first concatenation level is selected, the base station may send the page without concatenating the page. Since the first concatenation level is mapped to pages for HD Voice calls, this mapping will result in the base station refraining from concatenating pages that are sent to initiate wideband HD voice calls (i.e., voice calls that use EVRC-NW COP 0). In some implementations, it may be especially desirable for pages that initiate HD Voice calls to reach the intended WCDs, so that the WCDs can be provided with higher-quality voice service. With this in mind, a base station may increase the probability that a page for an HD Voice call reaches the intended WCD by refraining from concatenating pages for HD Voice calls.

Further, the amount of concatenation that is applied when the last-assigned codec is one of EVRC-NW COPs 1 to 7 may correspond to the data rate of the last-assigned codec. More specifically, as the audio quality of the last-assigned codec decreases, the data rate that is required to provide the audio encoded according to the code may also decrease. In particular, EVRC-NW specifies that the data rates for COPs 1 to 7 are 8.3 kbps, 6.64 kbps, 6.18 kbps, 5.82 kbps, 5.45 kbps, 5.08 kbps, and 4.0 kbps, respectively. As such, a base station may apply more concatenation to pages for operating points that provide lesser audio quality.

For instance, continuing the above example, the second concatenation level, which is selected when the last-assigned codec is one of EVRC-NW COPs 1 to 3, may indicate an amount of concatenation such that up to two pages can be included in a single GPM. Further, the third concatenation level, which is selected when the last-assigned codec is EVRC-NW COP 4, may indicate an amount of concatenation such that up to four pages can be included in a single GPM, while the fourth concatenation level, which is selected when the last-assigned codec is one of EVRC-NW COPs 5 to 7, may indicate an amount of concatenation such that up to eight pages can be included in a single GPM.

It should be understood that the above example in which codecs are mapped to four different page-concatenation levels is provided for purposes of illustration. As such, more or less page-concatenation levels are possible, without departing from the scope of the invention. For example, some embodiments may involve a binary decision between two page-concatenation levels. More specifically, a base station may disable concatenation for pages when the last-assigned codec for the target WCD is EVRC-NW COP 0, and enable concatenation for pages where the last-assigned codec for the target WCD is any of EVRC-NW COPs 1 to 7. Other examples and variations on the above examples are also possible.

In a further aspect, when pages are grouped into GPMs, concatenation of pages may be accomplished by assigning pages of the same concatenation level to the same timeslot or timeslots. To do so, the RAN may apply a hashing process based on the last-assigned codecs for WCDs to determine which timeslots are assigned to which WCDs. For example, the RAN may assign an 80 ms time slot to a given WCD by hashing the COP number (e.g., 0 to 7) of the codec that was last assigned to the WCD to a certain time slot or time slots. As a specific example, consider the scenario where the paging slot cycle is 5.12 seconds and the slot cycle is divided into 64 slots that are 80 ms in duration. In one implementation, WCDs that were last assigned COP 0 may be assigned to paging slots 10 and 20, WCDs that were last assigned one of COPs 1 to 3 may be assigned to paging slots 5, 15, 25, etc., WCDs that were last assigned COP 4 may be assigned to paging slots 7, 37, 57, etc., and WCDs that were last assigned one of COPs 5 to 7 may be assigned to paging slots 9, 49, 59, etc. Other implementations and variations on the above-described implementation are also possible.

B. Implementations of Exemplary Methods by a Switch

Figure 5B:
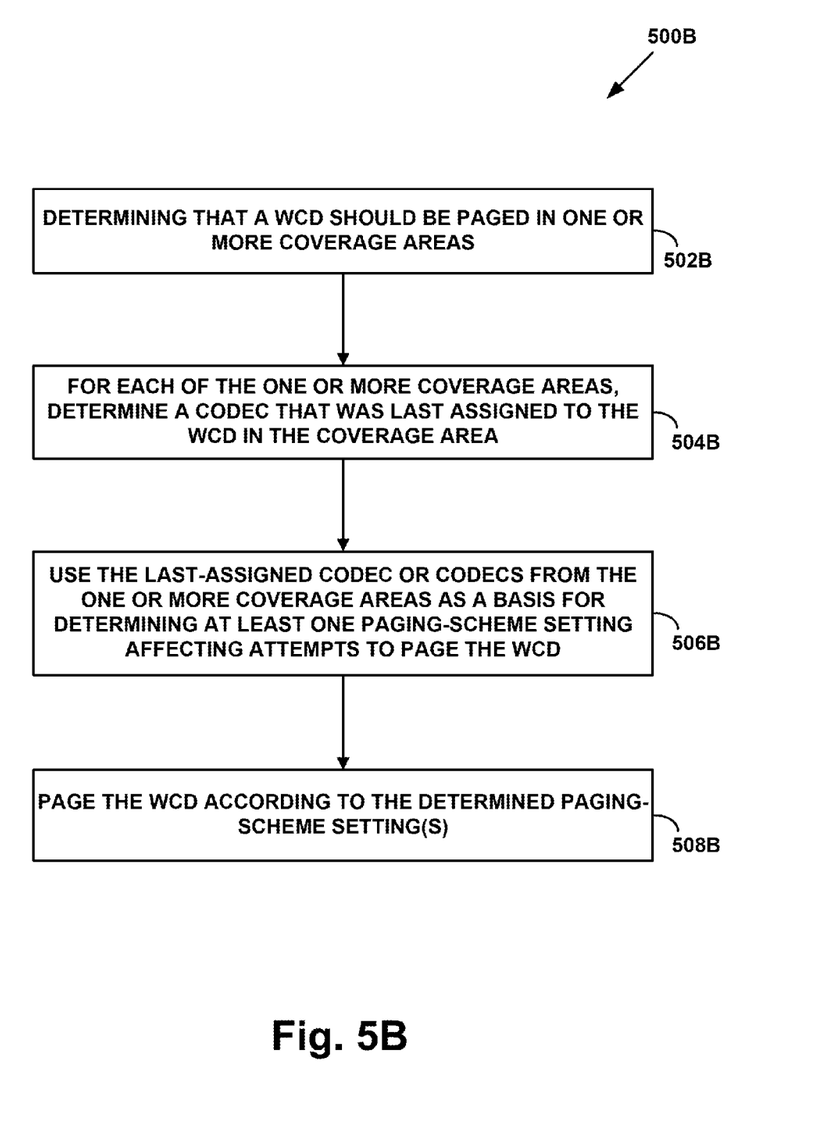

In some embodiments, method 400 may be implemented by a switch; e.g., by an MSC in a RAN. For example, FIG. 5B is a flow chart showing a method 500B, according to an exemplary embodiment. Method 500B is an implementation of the method 400 shown in FIG. 4, in which the functions are carried out by a switch (e.g., by an MSC).

More specifically, method 500B involves a switch determining that a WCD should be paged in one or more coverage areas, as shown by block 502B. Then, for each of the one or more coverage areas, the switch determine a codec that was last assigned to the WCD in the coverage area, as shown by block 504B. The switch may then use the last-assigned codec or codecs from the one or more coverage areas as a basis for determining at least one paging-scheme setting affecting attempts to page the WCD, as shown by block 506B. The switch may then page the WCD according to the determined paging-scheme setting(s), as shown by block 508B.

In order to determine the codec that was last assigned to a given WCD, at block 504C, the switch may reference a database that indicates, on a per-coverage-area basis, which codecs were last-assigned to which WCDs. For example, this data may be stored in the VLR. Accordingly, when a switch receives a communication directed to a WCD, the switch may determine the sector or sectors in which the WCD should be paged. The switch may then access the VLR to determine the last-assigned codec for the WCD in each coverage area where the WCD will be paged.

In some existing implementations, the VLR may indicate the service options that are supported by a given WCD. For example, according to some existing VLR implementations, the VLR maintains a record of the service option or options supported by each WCD (e.g., EVRC-NW, EVRC-B, and/or EVRC-A). So, for example, the VLR might indicate generally that a first WCD is capable of supporting SO 73 (i.e., EVRC-NW), while a second WCD is only capable of supporting SO 3 (i.e., EVRC-A). Other examples are also possible.

To facilitate method 500B, the VLR and/or the HLR may be modified to indicate the last codec that was actually assigned to each WCD in each of one or more coverage areas (i.e., the last-assigned codec or codecs for the WCD). For example, the VLR might keep a record of the last-assigned codec in just one coverage area (e.g., the coverage area in which a codec was most-recently assigned). As another example, the VLR could maintain data for a given WCD that indicates the last-assigned codec in each of a number of coverage areas, such as for the three most-recent coverage areas where the given WCD was assigned a codec, for instance. Other examples are also possible.

Further, a RAN may be configured to update the VLR with last-assigned-codec data so that the data is available when needed by a switch. Accordingly, when a base station assigns a codec to a WCD, the base station may send a message to its serving switch (e.g., its serving MSC), which indicates the particular codec that was assigned and the WCD to which the codec was assigned. For instance, an exemplary message might identify a WCD by its MIN, MDN, or IMSI, for example, and may indicate that the WCD was assigned one of EVRC-NW COP 0 to 7. Further, the message to the switch may indicate the coverage area in which the codec was assigned (e.g., by including the sector ID) and/or a time stamp indicating the time at which the codec was assigned. The message to the switch may additionally or alternatively include other types of information.

In an implementation where the RAN maintains last-assigned codec data in the VLR, an exemplary method may involve a switch receiving an indication of a codec that is last assigned to a WCD, and responsively updating the codec data that is maintained in the VLR to reflect the codec that was last assigned to the WCD. Further, all switches in a RAN may be configured to update the VLR with codec data, so that the VLR codec data indicates the last-assigned codecs for WCDs in coverage areas that are served by different switches.

In some embodiments, block 506B may involve determining the codec that was most recently assigned to the WCD, regardless of the particular coverage area in which the codec was assigned. In other embodiments, block 506B may involve determining the codec that was most recently assigned to the WCD in the coverage area where the WCD is about to be paged (which might not be the most recently assigned codec overall, if a codec has been subsequently assigned to the WCD in another coverage area.

Further, there may be scenarios where a WCD is about to be paged in a number of coverage areas at once, such as when a page is being sent in all the sectors in a paging zone. In this case, the RAN could determine the last-assigned codec to be the codec that was most recently assigned to the WCD in any one of the coverage areas where the WCD is about to be paged (e.g., in any of the sectors in a paging zone). Alternatively, the RAN could consider the last-assigned codecs in two or more coverage areas where the WCD is about to be paged. For example, the RAN could average the COP numbers of the last-assigned codec in some or all of the sectors in a zone where a WCD is about to be paged. To illustrate, if a WCD is about to be paged in a paging zone that includes three sectors, and the last-assigned codecs in the three sectors are COP 0, COP 1, and COP 5, then the last-assigned codec value may be to be COP 3, for purposes of method 500B. Other examples are also possible.

Referring now to block 506B of method 500B, the switch may determine various paging-scheme settings or various combinations of multiple paging-scheme settings, based on the last-assigned codec of the WCD that is going to be paged. For example, the switch may use the last-assigned codec to adjust one or more parameters of a zone-based paging scheme, such as a maximum-attempt parameter, the duration of a page-attempt timer, and/or the scope for each of one or more page attempts.

As noted above, the switch may adjust the maximum-attempt parameter based on the last-assigned codec. The maximum-attempt parameter specifies a maximum number of attempts that can be made to send a given page to the WCD. In an exemplary embodiment, when a WCD is likely to be assigned a high-quality codec (such as EVRC-NW COP 0), then the switch may adjust the maximum-attempt parameter in an effort to increase the probability that a WCD receives a page, and vice versa.

For example, if a WCD is likely to be assigned EVRC-NW COP 0 (as indicated by the last-assigned codec being EVRC-NW COP 0), then the switch may adjust the maximum-attempt parameter so as to increase the probability that the WCD receives the page, and uses EVRC-NW COP 0 for the communication. To illustrate, if a default setting for the maximum-attempt parameter is three, then the switch may set the maximum-attempt parameter to be a higher number, such as four or five, when the last-assigned codec is EVRC-NW COP 0. On the other hand, if the WCD is likely to be assigned a codec of lesser quality than EVRC-NW COP 0, then the then the switch may set the maximum-attempt parameter such that the probability of the WCD receiving the page is less than it would have been if the last-assigned codec was EVRC-NW COP 0. For instance, if the last-assigned codec is any of EVRC-NW COPs 1-4, then the switch may set the maximum-attempt parameter equal to three (or simply leave it set at three, if this is the default setting). And, if the last-assigned codec is any of EVRC-NW COPs 5-7, then the switch may set the maximum-attempt parameter equal to two. The above is but one of example of how the maximum-attempt parameter could be adjusted based on the last-assigned codec. Many other examples are possible.

As further noted, in some embodiments, a switch may adjust the duration of the page-attempt timer based on the last-assigned codec. A switch may be configured to start the page-attempt timer after an attempt to send the page, and then wait for the duration of the timer before initiating a next attempt to send the page (in the event that an acknowledgement from the WCD is not received before the page-attempt timer expires). Accordingly, in an exemplary embodiment, the switch may adjust the duration of the page-attempt timer in an effort to increase the probability that a WCD receives a page, when a WCD is likely to be assigned a high-quality codec (such as EVRC-NW COP 0).

For example, if a WCD is likely to be assigned EVRC-NW COP 0 (as indicated by the last-assigned codec being EVRC-NW COP 0), then the switch may set the duration to be a first duration that is longer than default duration. And, if the last-assigned codec is any codec other than EVRC-NW COP 0, then the switch may simply use the default duration for the page-attempt timer. Alternatively, if the last-assigned codec is any of EVRC-NW COPs 1-3, then the switch may set the duration to a second duration that is less than the first duration, and greater than the default duration. If the last-assigned codec is EVRC-NW COP 4, then the switch may use the default duration. And, if the last-assigned codec is any of EVRC-NW COPs 5-7, then the switch may set the duration to a third duration that is less than the default duration. The above examples of how the duration of the page-attempt timer could be adjusted based on the last-assigned codec are provided for purposes of illustration, and should not be considered limiting. Many other examples are possible.

Yet further, some embodiments may involve the switch using the last-assigned codec as a basis for determining the scope of each of one or more page attempts in a zone-based paging scheme and/or in an intersystem paging scheme that is being used to page the WCD. For instance, in an exemplary embodiment, the switch may adjust the scope of successive page attempts in an effort to increase the probability that a WCD receives a page on an earlier page attempt, when a WCD is likely to be assigned a high-quality codec (such as EVRC-NW COP 0).

As a specific example, if a WCD is likely to be assigned EVRC-NW COP 0 (as indicated by the last-assigned codec being EVRC-NW COP 0), then the switch may adjust the settings for zone-based paging such that the all attempts to send the page involve system-wide transmission of the page (i.e., transmission in the entire coverage area served by the switch). As a specific example, if the maximum-attempt parameter is set to three attempts, then the switch may send the page in all paging zones in its coverage area on the first, the second, and the third attempt.

On the other hand, if the last-assigned codec is any codec other than EVRC-NW COP 0, then the switch may use standard settings for zone-based paging. Such standard settings may specify, for example, that the first and second page attempt should be transmitted in the zone in which the target WCD is registered, and that only the third page attempt should be transmitted system-wide (e.g., in all zones). (Note that transmission of a page in all sectors of a particular zone may be referred to as "zone-wide" transmission.) Alternatively, if the last-assigned codec is any of EVRC-NW COPs 1-3, then the switch may set the first, second, and third attempt to be zone-wide, system-wide, and system-wide, respectively. Further, if the last-assigned codec is EVRC-NW COP 4, then the switch may use the standard setting, where the first and second page are zone-wide, and only the third attempt is system-wide. And, if the last-assigned codec is any of EVRC-NW COPs 5-7, then the switch may set all three attempts to be zone-wide.

As noted, some embodiments may involve a switch using the last-assigned codec as a basis for determining the scope for each of one or more page attempts in an intersystem paging scheme. In particular, if a WCD is likely to be assigned EVRC-NW COP 0 (as indicated by the last-assigned codec being EVRC-NW COP 0), then the switch may adjust the settings for intersystem paging such that intersystem paging is enabled for the first attempt to page a WCD, rather than waiting until the second or third attempt to enable intersystem paging (or, in other words, enable intersystem paging for all paging attempts that are made.)

On the other hand, if the last-assigned codec is a codec of lesser quality than EVRC-NW COP 0, then the switch may reduce the specified scope of intersystem paging for one or more paging attempts. For example, if the last-assigned codec is any codec other than EVRC-NW COP 0, then the switch may simply use default settings for intersystem paging (e.g., only enabling intersystem paging for the second and third attempts to send a page).

As another example, if the last-assigned codec is any of EVRC-NW COPs 1-3, then the switch may only enable intersystem paging for the second and third attempts to send a page. If the last-assigned codec is EVRC-NW COP 4, then the switch may only enable intersystem paging for the third attempt to send a page. And, if the last-assigned codec is any of EVRC-NW COPs 5-7, then the switch may disable intersystem paging for all attempts to send a page. Many other examples are possible.

VIII. Conclusion

Exemplary embodiments of the present invention have been described above. Those skilled in the art will understand, however, that changes and modifications may be made to these embodiments without departing from the true scope and spirit of the invention, which is defined by the claims.

I claim:

1. A method comprising:
    a radio access network (RAN) determining that a wireless communication device (WCD) should be paged in a coverage area of the RAN;
    determining a codec that was last assigned to the WCD in the coverage area;
    using the last-assigned codec as a basis for adjusting a paging process that is used to page the WCD, wherein using the last-assigned codec as a basis for adjusting the paging process that is used to page the WCD comprises, based at least in part on the last-assigned codec, determining a page-concatenation level; and
    paging the WCD according to the adjusted-paging process, wherein paging the WCD according to the adjusted paging process comprises concatenating a page to the WCD according to the determined page-concatenation level.

2. The method of claim 1, wherein the method is carried out by a base station in the radio access network.

3. The method of claim 2, wherein determining the codec that was last assigned to the WCD in the coverage area comprises the base station referencing a codec database that is maintained by the base station.

4. The method of claim 1, wherein determining the page-concatenation level comprises selecting a page-concatenation level based at least in part on a quality of the last-assigned codec.

5. The method of claim 1, wherein each of a plurality of page-concatenation levels corresponds to one or more codecs from a plurality of available codecs, and wherein determining the page-concatenation level for the page comprises determining the page-concatenation level that corresponds to the last-assigned codec.

6. The method of claim 1, wherein determining the page-concatenation level comprises determining whether to disable or enable page-concatenation for the page.

7. The method of claim 1, wherein the method is carried out by a switch in the radio access network.

8. The method of claim 7, wherein determining the codec that was last assigned to the WCD in the coverage area comprises the switch referencing codec data that is stored in a location register.

9. The method of claim 7, further comprising, before determining that the WCD should be paged:
    a switch in the radio access network receiving an indication of the codec that was last assigned to the WCD; and
    responsively updating the codec data that is maintained in the VLR such that the codec data indicates the codec that was last assigned to the WCD.

10. The method of claim 7:
    wherein using the last-assigned codec as a basis for adjusting the paging process that is used to page the WCD comprises, based at least in part on the last-assigned codec, determining at least one paging-scheme setting affecting attempts to page the WCD; and
    wherein paging the WCD according to the adjusted paging process comprises paging the WCD according to the at least one determined paging-scheme setting.

11. The method of claim 10, wherein the switch implements a zone-based paging scheme, and wherein the at least one paging-scheme setting comprises at least one setting of the zone-based paging scheme.

12. The method of claim 10, wherein the at least one paging-scheme setting comprises a maximum-attempt parameter that specifies a maximum number of attempts that can be made to send a given page to the WCD.

13. The method of claim 10, wherein the switch is configured for intersystem paging, and wherein the at least one paging-scheme setting comprises at least one setting for intersystem paging.

14. The method of claim 10, wherein the switch is configured to start a page-attempt timer after an attempt to send the page, wherein the switch is further configured to make a next attempt to send the page when an acknowledgement from the WCD is not received before the page-attempt timer expires, and wherein determining the at least one paging-scheme setting of the switch comprises using the last-assigned codec as a basis for determining a duration of the page-attempt timer.

15. A method comprising:
    determining, by a switch in the radio access network (RAN), that a wireless communication device (WCD) should be paged in a coverage area of the RAN;
    determining, by the switch, a codec that was last assigned to the WCD in the coverage area;
    using, by the switch, the last-assigned codec as a basis for adjusting a paging process that is used to page the WCD, wherein using the last-assigned codec as a basis for adjusting the paging process that is used to page the WCD comprises, based at least in part on a quality of the last-assigned codec, determining at least one paging-scheme setting affecting attempts to page the WCD; and
    paging the WCD according to the adjusted-paging process, wherein paging the WCD according to the adjusted paging process comprises paging the WCD according to the at least one determined paging-scheme setting.

16. A method comprising:
    determining, by a switch in a radio access network (RAN), that a wireless communication device (WCD) should be paged in a coverage area of the RAN;
    determining, by the switch, a codec that was last assigned to the WCD in the coverage area;
    using, by the switch, the last-assigned codec as a basis for adjusting a paging process that is used to page the WCD, wherein using the last-assigned codec as a basis for adjusting the paging process comprises the switch using the last-assigned codec as a basis for determining a scope for each of one or more page attempts in a paging scheme; and paging the WCD according to the adjusted-paging process.

17. A method comprising:
determining, by a radio access network (RAN), that a wireless communication device (WCD) should be paged in a coverage area of the RAN;
determining a codec that was last assigned to the WCD in the coverage area;
using both the last-assigned codec and an elapsed time since assignment of the last-assigned codec as a basis for adjusting a paging process that is used to page the WCD; and
paging the WCD according to the adjusted-paging process.

18. The method of claim 17, wherein using both the last-assigned codec and the elapsed time since assignment of the last-assigned codec as a basis for adjusting the paging process comprises:
conditioning the adjusting of the paging process on a determination that the elapsed time since assignment of the last-assigned codec is less than a threshold period of time.

19. A radio-access-network component comprising:
a non-transitory computer readable medium;
program instructions stored on the non-transitory computer readable medium an executable by at least one processor to:
determine that a wireless communication device (WCD) should be paged in a coverage area of a radio access network (RAN);
determine a codec that was last assigned to the WCD in the coverage area;
use the last-assigned codec as a basis to adjust a paging process that is used to page the WCD, wherein use of the last-assigned codec as a basis to adjust the paging process comprises determining; and
page the WCD according to the adjusted paging process.

20. The radio-access-network component of claim 19, wherein the radio-access-network component is a switch in the RAN.

21. The radio-access-network component of claim 20, wherein the program instructions stored on the non-transitory computer readable medium an executable by at least one processor to use the last-assigned codec as a basis to adjust the paging process comprise program instructions stored on the non-transitory computer readable medium an executable by at least one processor to determine, based at least in part on the last-assigned codec, at least one paging-scheme setting affecting attempts to page the WCD.

22. The radio-access-network component of claim 21, wherein the at least one paging-scheme setting comprises one or more of: (a) a maximum-attempt parameter that specifies a maximum number of attempts that can be made to send a given page to the WCD, (b) a duration of a page-attempt timer, and (c) a scope for each of one or more page attempts in the paging scheme.

23. A non-transitory computer readable medium having stored therein instructions that are executable to cause a radio access network (RAN) to perform functions comprising:
determining that a wireless communication device (WCD) should be paged in a coverage area of the RAN;
determining a codec that was last assigned to the WCD in the coverage area;
using the last-assigned codec as a basis for adjusting a paging process that is used to page the WCD, wherein using the last-assigned codec as a basis for adjusting the paging process that is used to page the WCD comprises, based at least in part on the last-assigned codec, determining a page-concatenation level; and
paging the WCD according to the adjusted paging process, wherein paging the WCD according to the adjusted paging process comprises concatenating a page to the WCD according to the determined page-concatenation level.

* * * * *